US009858815B2

(12) United States Patent
Shimamori

(10) Patent No.: US 9,858,815 B2
(45) Date of Patent: Jan. 2, 2018

(54) DEVICE AND METHOD FOR PROVIDING CONGESTION LOCATION INFORMATION AND MEDIUM STORING CONGESTION LOCATION INFORMATION PROVIDING PROGRAM

(71) Applicant: Honda Motor Co., Ltd., Tokyo (JP)

(72) Inventor: Takao Shimamori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/419,348

(22) Filed: Jan. 30, 2017

(65) Prior Publication Data

US 2017/0229015 A1    Aug. 10, 2017

(30) Foreign Application Priority Data

Feb. 9, 2016 (JP) ................................. 2016-022498

(51) Int. Cl.
*G08B 21/00* (2006.01)
*G08G 1/0967* (2006.01)
*G08G 1/052* (2006.01)
*G08G 1/01* (2006.01)

(52) U.S. Cl.
CPC ..... *G08G 1/096791* (2013.01); *G08G 1/0133* (2013.01); *G08G 1/052* (2013.01)

(58) Field of Classification Search
CPC .................................................. G08G 1/09679

USPC ............................ 340/902, 904, 905, 995.13
See application file for complete search history.

(56) References Cited

U.S. PATENT DOCUMENTS 8,884,781 B2 * 11/2014 Yuse .................... G08G 1/0104
340/902

FOREIGN PATENT DOCUMENTS

JP          2009-87249 A     4/2009

* cited by examiner

*Primary Examiner* — Jeffery Hofsass
(74) *Attorney, Agent, or Firm* — Westerman, Hattori, Daniels & Adrian, LLP

(57) ABSTRACT

A travel information acquisition section acquires travel information including at least a position, speed, and deceleration of the vehicle. An information generation section generates congestion location information indicating a position of a congestion tail based on the travel information. A transmission section transmits the congestion location information generated by the information generation section to another vehicle. The information generation section determines whether or not congestion is occurring at the current position of the vehicle based on an amount of reduction in speed from the maximum speed and the deceleration in a first time period of a specific length, and when determined that congestion is occurring, generates the congestion location information including position information containing the current position of the vehicle itself as information indicating the congestion tail position.

13 Claims, 5 Drawing Sheets

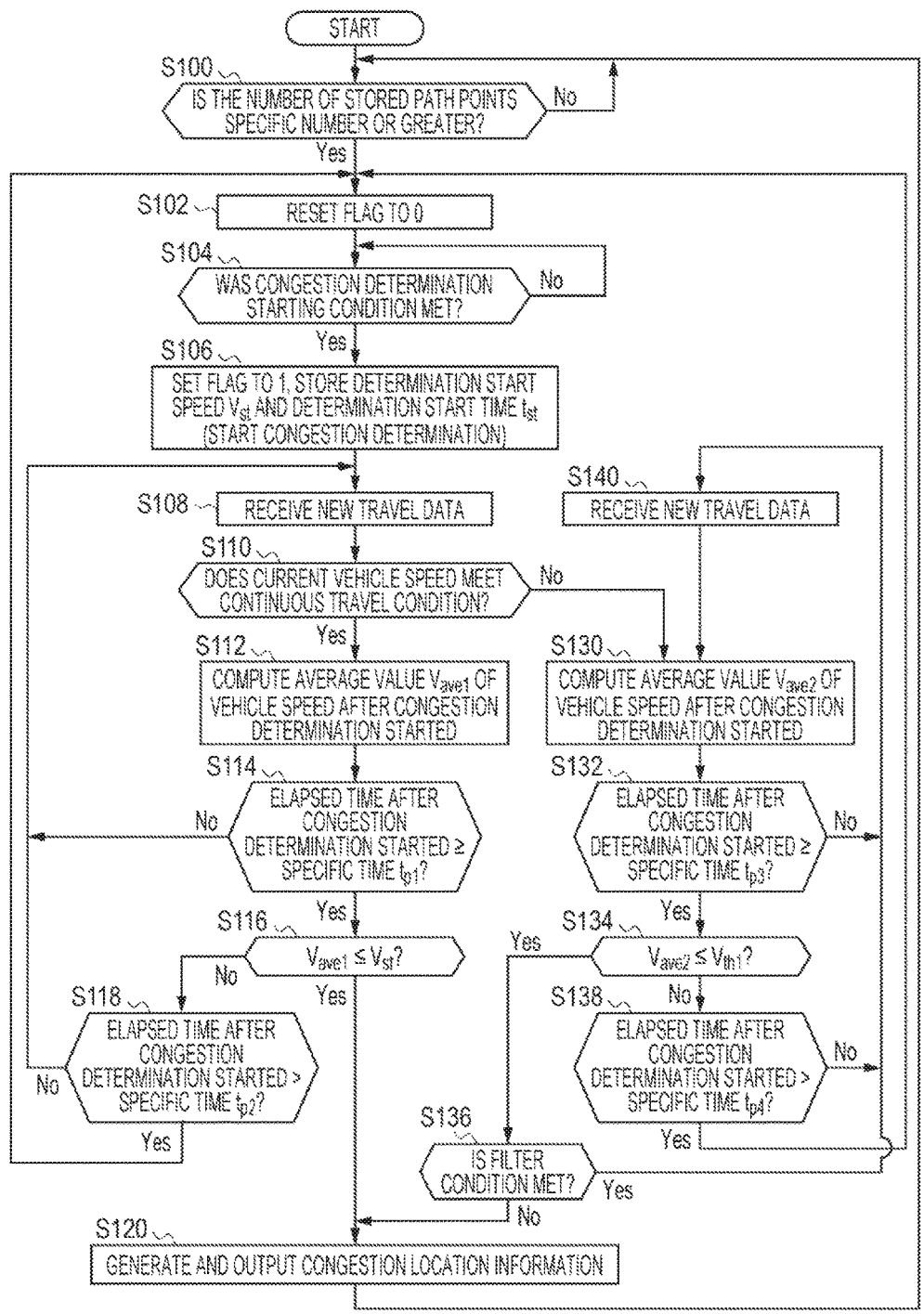

DEVICE AND METHOD FOR PROVIDING CONGESTION LOCATION INFORMATION AND MEDIUM STORING CONGESTION LOCATION INFORMATION PROVIDING PROGRAM

CROSS REFERENCES TO RELATED APPLICATIONS

The present application claims priority under 35 U.S.C. §119 to Japanese Patent Application No. 2016-022498, filed Feb. 9, 2016, entitled "Device, Method, and Program for Providing Congestion Location Information." The contents of this application are incorporated herein by reference in their entirety.

TECHNICAL FIELD

The present disclosure relates to a device that exchanges congestion information with other vehicles and notifies the driver of the presence of congestion, and in particular relates to a device, method, and program that determine a possibility of the position of the vehicle itself being the tail of traffic congestion, that transmit the tail position information to other vehicles and receive congestion tail position information from other vehicles, and that notify (or output information and/or a signal to notify) the driver of the presence of congestion ahead of the vehicle itself.

BACKGROUND

Hitherto, as a device that notifies the driver of congestion information, an "onboard traffic warning device" is known (Japanese Unexamined Patent Application Publication No. 2009-87249) that receives information from outside regarding areas on a road where accidents due to traffic congestion frequently occur (frequent congestion accident areas), and when the current position of the vehicle itself is within a frequent congestion accident area, determines whether or not the vehicle itself is a congestion tail from the vehicle speed of the vehicle itself and the distance from a following vehicle, and if the vehicle itself is a congestion tail, the position of the vehicle itself is broadcast to other surrounding vehicles as the congestion tail position.

However, devices hitherto will not function without a map database indicating the frequent congestion accident areas and cannot notify other surrounding vehicles of the congestion tail information in cases in which congestion has occurred in an area lacking information stating that the area is a frequent congestion accident area.

SUMMARY

Given these circumstances, it is desirable to realize a system that can detect congestion occurring and share information regarding locations where congestion occurs between vehicles even when there are no map databases or prior information regarding congestion accident areas.

According to one aspect of the present disclosure, a congestion location information providing device disposed in a vehicle includes: a travel information acquisition section that acquires travel information including at least a position, a speed, and a deceleration of the vehicle; an information generation section that generates congestion location information indicating a position of a congestion tail based on the travel information; and a transmission section that transmits the congestion location information generated by the information generation section to another vehicle. In a first time period of a specific length, the information generation section determines whether or not congestion is occurring at the current position of the vehicle based on an amount of reduction in speed from a maximum speed in the period and on the deceleration and, when determined that congestion is occurring, generates the congestion location information including position information containing the current position of the vehicle as information indicating the congestion tail position.

According to another aspect of the present disclosure, when the speed reduction amount is greater than a specific reduction amount in the first time period and the deceleration is greater than a specific deceleration, the information generation section starts determining whether or not congestion is occurring, and, when, after starting the determination, an average value of the speed has fallen to a specific speed or below in a second time period of a specific length, the information generation section determines that congestion is occurring or determines that congestion is possibly occurring.

According to another aspect of the present disclosure, the information generation section determines that congestion is not occurring when, after starting the determination as to whether or not congestion is occurring, the speed has reduced to a specific speed or below and the speed has then risen to a specific speed or greater in a specific time since the reduction in speed.

According to another aspect of the present disclosure, after the determination that congestion is possibly occurring, the information generation section determines whether or not at least one out of a continuously stopped time of the vehicle, a straight line displacement distance of travel resumed after stopping, or a crawling time meets a specific condition in a period extending from the start of the determination as to whether or not congestion is occurring until the determination that congestion is possibly occurring, and determines that congestion is not occurring when the condition is met.

According to another aspect of the present disclosure, the congestion location information providing device further includes a reception section that receives congestion location information transmitted by another vehicle, an information output section that determines whether or not a driver of the vehicle is to be notified of the congestion location information received from the other vehicle, based on the travel information, and an output controller that generates a signal including information to notify the driver of the presence of congestion based on the received congestion location information to be notified to the driver determined by the information output section and outputs the signal. When a position of a congestion tail indicated by the received congestion location information is present within a specific distance range from the current position of the vehicle and within a specific angle range centered on the travel direction of the vehicle, the information output section determines that the driver is to be notified of the received congestion location information.

According to another aspect of the present disclosure, a specific number of position information items for positions that the vehicle that generated the congestion location information recently passed through are included in the received congestion location information, and when the received congestion location information includes a specific number or greater of position information items indicating positions that match, to within a specific distance error range, a specific number of positions the vehicle has recently passed through, the information output section determines that the driver is to be notified of the received congestion location information.

According to another aspect of the present disclosure, a method for providing congestion location information executable by a processing device of a congestion location information providing device disposed in a vehicle, and the method includes: a step of a travel information acquisition section of the processing device acquiring travel information including at least a position, a speed, and a deceleration of the vehicle; a step of an information generation section of the processing device generating congestion location information indicating a position of a congestion tail based on the travel information; and a step of a transmission section of the processing device transmitting the congestion location information generated by the information generation section to another vehicle. In the generation step, in a first time period of a specific length, the information generation section determines whether or not congestion is occurring at the current position of the vehicle based on an amount of reduction in speed from a maximum speed in the period and on the deceleration and, when determined that congestion is occurring, generates the congestion location information including position information containing the current position of the vehicle as information indicating the congestion tail position.

According to another aspect of the present disclosure, the method further includes: a step of a reception section of the processing device receiving congestion location information transmitted by another vehicle; a step of an information output section of the processing device determining whether or not the driver is to be notified of the congestion location information received from the other vehicle, based on the travel information; and a step of an output controller of the processing device generating a signal including information to notify the driver of the presence of congestion based on the received congestion location information to be notified to the driver determined by the information output section and outputting the signal. In the determination step, when a position of a congestion tail indicated by the received congestion location information is present within a specific distance range from the current position of the vehicle and within a specific angle range centered on the travel direction of the vehicle, the information output section determines that the driver is to be notified of the received congestion location information.

According to another aspect of the present disclosure, a non-transitory computer readable medium is provided. The medium stores a program causing a computer included in a congestion location information providing device disposed in a vehicle to function as: a travel information acquisition section that acquires travel information including at least a position, a speed, and a deceleration of the vehicle; an information generation section that generates congestion location information indicating a position of a congestion tail based on the travel information; and a unit for transmitting the congestion location information generated by the information generation section to another vehicle via a transmission section included in the congestion location information providing device. In a first time period of a specific length, the information generation section determines whether or not congestion is occurring at the current position of the vehicle based on an amount of reduction in speed from a maximum speed in the period and the deceleration, and when determined that congestion is occurring, generates the congestion location information including position information containing the current position of the vehicle as information indicating the congestion tail position.

According to another aspect of the present disclosure, the program causes the computer to further function as: a reception section that receives congestion location information transmitted by another vehicle; an information output section that determines whether or not the driver is to be notified of the congestion location information received from the other vehicle, based on the travel information; and an output controller that generates a signal including information to notify the driver of the presence of congestion based on the received congestion location information to be notified to the driver determined by the information output section and outputs the signal. When a position of a congestion tail indicated by the received congestion location information is present within a specific distance range from the current position of the vehicle and within a specific angle range centered on the travel direction of the vehicle, the information output section determines that the driver is to be notified of the received congestion location information.

BRIEF DESCRIPTION OF THE DRAWINGS

The advantages of the disclosure will become apparent in the following description taken in conjunction with the following drawings.

FIG. 2 is a flowchart illustrating a procedure of congestion location determination processing executed by the congestion location information providing device illustrated in FIG. 1.

DETAILED DESCRIPTION

Explanation follows regarding an embodiment of the present disclosure with reference to the drawings.

Figure 1:
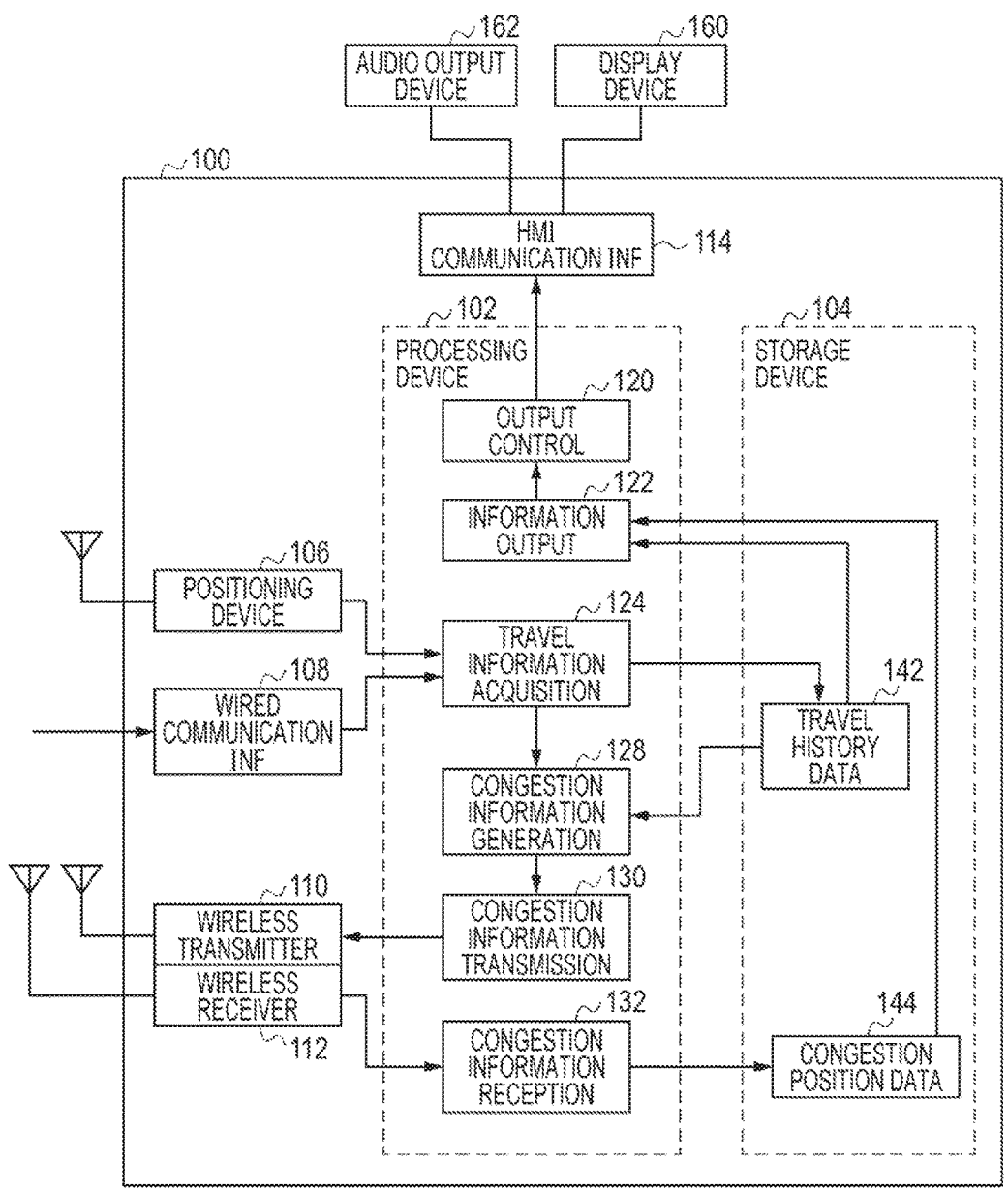
FIG. 1 is a diagram illustrating a configuration of a congestion location information providing device according to an embodiment of the present disclosure.

FIG. 1 is a diagram illustrating a configuration of a congestion location information providing device according to an embodiment of the present disclosure.

This congestion location information providing device (also referred to as an information providing device hereafter) 100 is used in a vehicle. The information providing device 100 includes a processing device 102, a storage device 104, a positioning device 106, a wired communication interface (INF) 108, a wireless transmitter 110, a wireless receiver 112, and a HMI communication interface (INF) 114.

The positioning device 106 is a device that outputs positioning information or the like for identifying the current position of the vehicle itself. The positioning device 106 includes a global positioning system (GPS) device that, for example, receives GPS signals from plural GPS satellites and acquires the current time and the latitude, longitude, and altitude of the current position. Note that, in addition to a GPS signal, the positioning device 106 may, for example, also receive an electromagnetic wave transmitted by a base station for cellular telephones, and may acquire the current time and the latitude, longitude, and altitude of the current position based on position information of the base station.

The wired communication INF 108 is a communication interface for exchanging information with another device such as an electronic control unit (ECU) included in the vehicle itself, via a wired transmission path. The wired communication INF 108 may be an interface that conforms with a communication standard such as universal serial bus (USB) or controller area network (CAN).

The wireless transmitter 110 and the wireless receiver 112 are, for example, WiFi communication devices, and transmit and receive respective information with other vehicles surrounding the vehicle by short-range wireless communication. Moreover, the wireless transmitter 110 and the wireless receiver 112 are not limited thereto, and may also be configured as a wireless communication device capable of more long-range communication, and may, for example, be configured as a portion of a roadside-to-vehicle communication system that wirelessly communicates with a roadside wireless communication device installed on the road.

The HMI communication INF 114 is an interface, for communicating with a human-machine interface (HMI) device, such as a display device 160 configured by an onboard liquid crystal display or the like, or an audio output device 162 such as an onboard speaker, provided outside of the information providing device 100. The processing device 102, for example, issues warnings related to congestion using the audio output device 162 via the HMI communication INF 114, and/or displays information related to congestion on the display device 160. Instead of or in addition to this, the display device 160 and/or the audio output device 162 may be included in another device such as a navigation device onboard the vehicle itself, and the information providing device 100 may be configured to work together with the other device by communicating with the other device via the wired communication INF 108 described above, and to issue a warning related to congestion using the audio output device 162 and/or display information related to the congestion on the display device 160.

The storage device 104 may, for example, be configured by semiconductor memory and/or a hard disk drive (HDD), and may be configured as any non-volatile storage device or any combination of a non-volatile storage device and a volatile storage device. The storage device 104 stores travel history data 142 and congestion position data 144.

Travel data in a time series, including positions passed by the vehicle itself (path points) acquired at specific time intervals, and travel states (vehicle speed, acceleration, etc.) are included in the travel history data 142. A time series of path points (path history) is thus stored in the travel history data 142.

The congestion position data 144 includes congestion location information received by a congestion information reception unit 132 (described later) from other vehicles surrounding the vehicle via the wireless receiver 112.

The processing device 102 is a computer including a processor such as a CPU, and memory such as ROM written with a program and RAM for temporarily storing data. Moreover, the processing device 102 includes an output control unit 120, an information output unit 122, a travel information acquisition unit 124, a congestion information generation unit 128, a congestion information transmission unit 130, and a congestion information reception unit 132. Each of these units included in the processing device 102 may be implemented by the processing device 102, which is a computer, executing a program, and the computer program may be stored on any storage medium that can be read by the computer. Instead of or in addition to this, a portion or all of these respective units may each be configured by hardware that includes one or more electronic circuit components.

At specific time intervals, the travel information acquisition unit 124 acquires data indicating the current time and the latitude, longitude, and altitude of the current position (passed position, path point) from the positioning device 106, and acquires data indicating the current speed, acceleration, and travel direction of the vehicle via the wired communication INF 108 from an ECU or the like included in the vehicle itself. The travel information acquisition unit 124 then outputs this data to the congestion information generation unit 128 as travel data.

More specifically, the travel data is, for example, made up of data as indicated in Table 1. Herein, the latitude, longitude, and altitude correspond to the data representing the path point, and the speed, acceleration, and travel direction correspond to the data representing the travel state at that path point.

TABLE 1

| Travel Data | |
| --- | --- |
| Item | Unit |
| time | |
| Latitude | degrees |
| Longitude | degrees |
| Altitude | m |
| Speed | m/s |
| Acceleration | m/s$^2$ |
| Travel direction | degrees |

From travel data acquired at the specific time intervals, the travel information acquisition unit 124 extracts items of travel data at a specific separation (namely, extracts travel data such that the separation between adjacent path points is a specific distance (for example, a separation of 5 m)), and sequentially adds the extracted travel data to the time series to include the extracted travel data in the travel history data 142 stored by the storage device 104. Moreover, when the number of items of stored travel data has exceeded a specific number (for example, 20), the travel information acquisition unit 124 discards the oldest item of travel data, and holds the specific number of recent items of travel data in the travel information acquisition unit 124. The travel history data 142 is accordingly data representing a time series of a specific number of path points in a line at 5 m separations from each other (plural path points lined up in a time series are referred to as "path history" hereafter).

The congestion information generation unit 128 sequentially stores, in memory (not illustrated) in the processing device 102 or the storage device 104, travel data output from the travel information acquisition unit 124 at specific time intervals, and executes congestion location determination processing while holding the specific number of recent items of travel data. Namely, the congestion information generation unit 128 determines whether or not congestion has occurred in the place that the vehicle itself is travelling through based on the vehicle speed and deceleration of the vehicle itself. When determined that congestion has occurred, the congestion information generation unit 128 generates congestion location information that includes the recent path history of the vehicle itself as the information indicating the position of the congestion tail, and outputs the generated congestion location information to the congestion information transmission unit 130. The procedure of the congestion location determination processing executed by the congestion information generation unit 128 is described later.

The congestion information transmission unit 130 transmits (for example, broadcasts) the congestion location information received from the congestion information generation unit 128 to other vehicles surrounding the vehicle itself via the wireless transmitter 110.

The congestion information reception unit 132 receives congestion location information from other vehicles surrounding the vehicle itself via the wireless receiver 112, and stores the received congestion location information by sequentially adding the received congestion location information to the congestion position data 144 stored by the storage device 104.

The information output unit 122 executes congestion information output processing, determines whether or not there is congestion location information to be provided to the driver amongst the congestion location information in the congestion position data 144 stored by the storage device 104 (namely, the congestion location information that was received from other vehicles and then stored). If there is congestion location information to be provided to the driver, the information output unit 122 outputs the congestion location information to the output control unit 120. More specifically, the information output unit 122 determines whether or not the driver is to be notified of the received congestion location information based on the information indicating the position of the vehicle itself (for example, the recent path history), and the path history of the other vehicles included in the received congestion location information (for example, whether or not congestion is present ahead of the vehicle itself), and outputs the congestion location information to the output control unit 120 when determined that the driver is to be notified. The procedure of the congestion information output processing is described later.

The output control unit 120 generates information (or a signal that includes the information) for notifying the driver of the presence of congestion based on the congestion location information received from the information output unit 122, and outputs the generated information or signal to the audio output device 162 and/or the display device 160 via the HMI communication INF 114.

Note that in the above description, for example, the travel information acquisition unit 124 corresponds to a travel information acquisition section, the congestion information generation unit 128 corresponds to an information generation section, the congestion information transmission unit 130 corresponds to a transmission section, the congestion information reception unit 132 corresponds to a reception section, the information output unit 122 corresponds to an information output section, and the output control unit 120 corresponds to an output controller. Moreover, the travel data corresponds to travel information.

The congestion location information providing device 100, which has the configuration described above, determines whether or not congestion is occurring based on the vehicle speed and deceleration of the vehicle itself. When it has been determined that congestion is occurring, the congestion location information providing device 100 generates congestion location information that includes the recent path history of the vehicle itself as information indicating the position of the congestion tail, and transmits the generated congestion location information to other vehicles. When congestion location information has been received from another vehicle, the information providing device 100 determines whether or not the driver is to be notified of the received congestion location information. When determined that the driver is to be notified, the information providing device 100 outputs information (or a signal including information) to notify the driver of the presence of congestion to, for example, the audio output device 162 and/or the display device 160, based on the congestion location information.

The information providing device 100 can thereby detect congestion occurrences based on the vehicle speed and deceleration of the vehicle itself without using map information, and can share the information regarding detected locations where congestion is occurring with other vehicles and can notify the driver of the presence of congestion ahead of the vehicle itself based on the information regarding the congestion occurrence locations received from other vehicles without using map information.

Next, explanation follows regarding processing by the processing device 102. As described above, the processing device 102 executes congestion location determination processing and congestion information output processing.

Congestion Location Determination Processing

First, explanation follows regarding congestion location determination processing.

In the congestion location determination processing, processing to determine the presence or absence of congestion occurrences is started when it has been determined that a specific congestion determination starting condition has been met based on the vehicle speed and deceleration of the vehicle itself. The congestion location determination processing predicts whether the road that the vehicle itself is currently travelling on is a road such as an expressway (a continuous-travel road) on which stopping due to traffic signals or the like does not occur, or is a road such as general urban roads (an intermittent-travel road) on which stopping due to traffic signals or the like and crawling due to narrow sections of road or the like do occur, and detects congestion occurrences using a different condition for each case. Moreover, when a congestion occurrence has been detected, the information providing device 100 generates congestion location information that includes a path history formed from a specific number of recent path points as information representing a tail location of the congestion, and transmits the generated congestion location information to other vehicles.

FIG. 2 is a flowchart illustrating a procedure of the congestion location determination processing. The congestion location determination processing is processing executed by the congestion information generation unit 128, starts operation when the power of the information providing device 100 is turned ON, and ends when the power thereof is turned OFF. Moreover, in parallel with the congestion location determination processing, the travel information acquisition unit 124 sequentially and continuously adds the travel data having 5 m separations in the travel history data 142 in the storage device 104 as described above, and holds a specific number (for example, 20) of recent items of travel data in the travel history data 142.

When the processing starts, the congestion information generation unit 128 first determines whether or not the number of path points (and consequently, the number of items of travel data) stored in the travel history data 142 in the storage device 104 is the specific number (for example, 15) or higher (S100). When the number of stored path points is less than the specific number (for example, 15) (NO at S100), processing then returns to step S100 and is repeated. The number of stored path points at the initial stage of the congestion location determination processing is employed as a condition for performing the subsequent processing in this manner so that the specific number of path points will be included in the path history when generating the congestion location information that includes the recent path history as data indicating the position of the congestion tail at step S120, described later.

When the number of stored path points is the specific number or greater (YES at S100), a congestion determination start flag (a flag indicating whether or not congestion determination is starting) is next reset to zero (indicating that the determination has not been started) (S102). After the flag has been reset, when travel data has been output from the travel information acquisition unit 124 to the congestion information generation unit 128 as described above, the congestion information generation unit 128 receives and sequentially stores the travel data in memory (not illustrated) in the processing device 102 or in the storage device 104, and holds the specific number of recent items of travel data.

The congestion information generation unit 128 subsequently determines whether or not the congestion determination starting condition has been met based on the current vehicle speed and deceleration (a numeric value obtained by inverting the sign of the acceleration) in the travel data output by the travel information acquisition unit 124 (S104). The congestion determination starting condition may, for example, be set to "a deceleration equal to or more than a specific speed reduction amount (40 km/h) occurs, and the deceleration is a deceleration equal to or more than a specific average deceleration (for example, 0.035 G when converted to G)". Such a determination may, for example, be performed by determining whether or not a speed reduction of 40 km/h or greater has occurred within a specific time $T_{th1}$, with the time required for a reduction in speed of 40 km/h to occur with a 0.035 G deceleration (32.4 seconds) serving as the specific time $T_{th1}$. For example, the congestion determination starting condition is met if the current speed is less than a speed obtained by subtracting 40 km/h from a maximum speed in a period extending from the current time backwards by a specific time $T_{th1}$.

In addition to the above condition, configuration may be made such that the vehicle speed is not 60 km/h or greater when the congestion determination starts, by including in the congestion determination starting condition a condition stating that "in cases in which there was a maximum detected speed of 100 km/h or greater, there is a reduction in speed to 60 km/h or less within the specific time $T_{th1}$ after the maximum speed was detected". Moreover, whether or not the congestion determination starting condition has been met may be determined by limiting the determination to cases in which there has been a period in which the vehicle speed is 50 km/h or greater within a period extending from the current time backwards by the specific time $T_{th1}$ such that the vehicle speed is not less than 10 km/h (50 km/h−40 km/h (the specific speed reduction amount)) when the congestion determination starts.

When the congestion determination starting condition has not been met (NO at S104), the congestion information generation unit 128 then returns to step S104 and repeats the processing, or when the congestion determination starting condition has been met (YES at S104), the processing for congestion determination starts. More specifically, the congestion determination start flag is set to 1, the value of the vehicle speed determined at step S104 is stored as a determination start speed $V_{st}$, and the time at which the vehicle speed was received from the travel information acquisition unit 124 (namely, a time included in the travel data that includes the vehicle speed) is stored as a determination start time $t_{st}$ (S106).

The congestion information generation unit 128 subsequently receives and stores new travel data output from the travel information acquisition unit 124 (S108), and determines whether or not the current vehicle speed included in the received travel data meets a continuous travel condition (S110). The continuous travel condition is a condition for establishing whether the road that the vehicle itself is currently travelling on is a road such as an expressway (a continuous-travel road) on which stopping due to traffic signals or the like does not occur, or is a road such as general urban roads (an intermittent-travel road) on which stopping due to traffic signals or the like and crawling due to narrow sections of road or the like do occur. The continuous travel condition may, for example, be set to "the vehicle speed exceeds a specific vehicle speed $V_{th1}$ (for example, 1 km/h)".

Then, at step S110, when the current vehicle speed meets the continuous travel condition (YES at S110), determination is made that the vehicle itself is travelling on a continuous-travel road (for example, an expressway), and determination is next made as to whether or not a congestion occurrence condition for continuous travel has been met (S112, S114, S116). The congestion occurrence condition for continuous travel may, for example, be set to "a specific time $t_{p1}$ (for example, 120 seconds) has elapsed after congestion determination started, and an average value of the vehicle speed (average vehicle speed) $V_{ave1}$ after the congestion determination started is the determination start speed $V_{st}$ or less".

More specifically, at step S112, the congestion information generation unit 128 uses the current vehicle speed included in the travel data received at step S108 to find the average vehicle speed $V_{ave1}$ after the congestion determination started (namely, after the flag was set to 1 at step S106) according to the following equation (S114).

$$V_{ave1} = (V_{a1} + V_{a2} + \ldots + V_{an})/n \tag{1}$$

Here, $V_{a1}$, $V_{a2}$, ..., $V_{an}$ are vehicle speeds included in travel data received from the travel information acquisition unit 124 and stored at step S108 after the congestion determination started, and n is the number of those vehicle speeds (accordingly, when step S112 is executed for the first time after the flag being set to 1, $V_{ave1}$ is equal to $V_{a1}$).

The congestion information generation unit 128 subsequently determines whether or not the specific time $t_{p1}$ (for example, 120 seconds) has elapsed since the start of congestion determination based on a determination start time $t_{st}$ stored at step S106 and the current time included in the travel data received from the travel information acquisition unit 124 at step S108 (S114). When the specific time $t_{p1}$ has not elapsed (NO at S114), processing returns to step S108 and is repeated.

However, when the specific time $t_{p1}$ has elapsed since the start of congestion determination (YES at S114), the congestion information generation unit 128 determines whether or not the average vehicle speed $V_{ave1}$ is the determination start speed $V_{st}$ or less (S116). Then, if the average vehicle speed $V_{ave1}$ is the determination start speed $V_{st}$ or less (YES at S116), determination is made that congestion has occurred on the continuous-travel road, congestion location information is generated including the path history making up the specific number (for example, 15) of path points including the recent path points as the position of the congestion tail, the generated congestion location information is output to the congestion information transmission unit 130 (S120), and processing returns to step S100 and is repeated. In this embodiment, the congestion information generation unit 128 generates the congestion location information that includes the path history making up the specific number of path points having specific separations (for example, 5 m separations) by incorporating the travel data in the travel history data 142 stored in the storage device 104 into the congestion location information.

At step S116, when the average vehicle speed $V_{ave1}$ exceeds the determination start speed $V_{st}$ (NO at S116), determination is made as to whether or not a specific time $t_{p2}$ (for example, 240 seconds) has elapsed since the congestion determination started based on the determination start time $t_{st}$ and the current time included in the travel data received from the travel information acquisition unit 124 at step S108 (S118). Then, when the specific time $t_{p2}$ has elapsed (YES at S118), determination is made that congestion is not occurring on the continuous-travel road, and processing returns to step S102 and a standby state is adopted for the congestion determination starting condition to be met again.

When the specific time tp2 since the congestion determination started at step S118 has not elapsed (NO at S118), processing returns to step S108 and is repeated. Thus, if the vehicle speed decreases within the specific time $t_{p2}$ elapsing such that the congestion occurrence condition for continuous travel ($V_{ave1} \leq V_{st}$) is met, step S116 determines that congestion has occurred on the continuous-travel road.

Figure 3A:
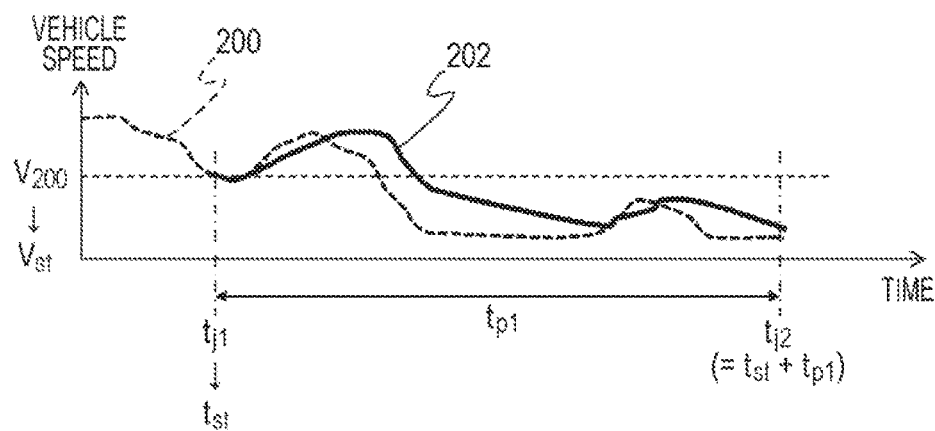
FIGS. 3A and 3B are diagrams illustrating examples of speed change of the vehicle itself in cases in which determination is made that congestion is occurring on a continuous-travel road in the congestion location information providing device illustrated in FIG. 1.
Figure 3B:
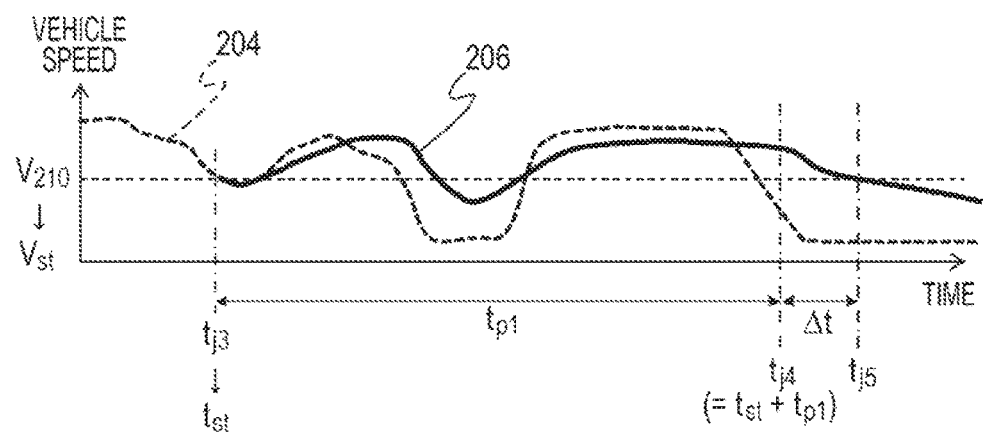

FIGS. 3A and 3B are diagrams illustrating examples of vehicle speed change of the vehicle itself in a case in which determination is made that congestion has occurred on a continuous-travel road. In the graphs FIG. 3A and FIG. 3B, the horizontal axes represent time and the vertical axes represent the vehicle speed of the vehicle itself.

In FIG. 3A, the dashed curved line 200 in the drawing is the vehicle speed. Here, congestion determination has started at time $t_{j1}$. When the congestion determination starts, the determination start time $t_{st}$ is set to $t_{j1}$, and the determination start speed $V_{st}$ is set to the vehicle speed $V_{200}$ at time $t_{j1}$ (step S106 of FIG. 2). Calculation of the average value $V_{ave1}$ of the vehicle speed indicated by the solid curved line 202 in the drawings is accordingly started. Subsequently, at a time $t_{j2}$ at which the specific time $t_{p1}$ has elapsed since $t_{j1}$, comparison between the average vehicle speed $V_{ave1}$ (namely, the curved line 202) and the $V_{st}$ (namely, V200) is started (steps S114, S116 of FIG. 2), and determination is made that congestion is occurring since the average vehicle speed $V_{ave1}$ at time $t_{j2}$ is smaller than $V_{st}$.

In FIG. 3B, a congestion determination is started at time $t_{j3}$ for the vehicle speed indicated by the dashed curved line 204 in the drawing, the determination start time $t_{st}$ is set to $t_{j3}$, and the determination start speed $V_{st}$ is set to the vehicle speed $V_{210}$ at time $t_{j3}$ (step S106 of FIG. 2). Calculation of the average value $V_{ave1}$ of the vehicle speed indicated by the solid curve 206 in the drawing is accordingly started. Subsequently, at a time $t_{j4}$ at which the specific time $t_{p1}$ has elapsed since $t_{j3}$, a comparison between the average vehicle speed $V_{ave1}$ (the curve 206) and the $V_{st}$ (namely, $V_{210}$) is started (steps S114, S116 of FIG. 2) but it is not determined that congestion is occurring at time $t_{j4}$ since the average vehicle speed $V_{ave1}$ (the curve 206) at time $t_{j4}$ is greater than $V_{st}$ ($V_{210}$). Then, at a time $t_{j5}$ succeeding the time $t_{j4}$ by $\Delta t$, at the point in time at which the average vehicle speed $V_{ave1}$ (the curve 206) becomes smaller than $V_{st}$ ($V_{210}$), determination is made that congestion has occurred. Here, the summed value of $t_{p1}$ and $\Delta t$ does not exceed $t_{p2}$. Although the vehicle speed and the average vehicle speed are measured or calculated as separate values at specific time intervals in the embodiment, they are respectively illustrated as a continuous dashed line and solid line in FIG. 3A and FIG. 3B to simplify the representation and facilitate understanding.

Returning to step S110 of FIG. 2, when the current vehicle speed does not meet the continuous travel condition (NO at S110), the congestion information generation unit 128 determines that the vehicle itself is travelling on an intermittent-travel road (for example, an urban road), and determination is then made as to whether or not a congestion occurrence condition for intermittent travel has been met (S130, S132, S134). The congestion occurrence condition for intermittent travel may, for example, be set to "a specific time $t_{p3}$ (for example, 120 seconds) has elapsed after congestion determination started (namely, after the flag was set to 1), and an average value of the vehicle speed (average vehicle speed) $V_{ave2}$ after the congestion determination started is a specific determination speed $V_{th1}$ (for example, 20 km/h) or less".

More specifically, the average vehicle speed) $V_{ave2}$ after the congestion determination started (namely, after the flag was set equal to 1 at step S106) is found based on the vehicle speeds included in the travel data received at step S108 and at step S140, described later, according to the equation below (S130).

$$V_{ave2} = (V_{b1} + V_{b2} + \ldots + V_{bm})/m \qquad (2)$$

Here, $V_{b1}, V_{b2}, \ldots, V_{bm}$ are vehicle speeds included in travel data received from the travel information acquisition unit 124 and stored at step S108 or S140 after the congestion determination started, and m is the number of the vehicle speeds. Accordingly, when step S130 is executed for the first time after the flag being set to 1, $V_{ave2}$ is equal to $V_{b1}$ (the vehicle speed received at step S108). Note that the vehicle speeds $V_{b2}, \ldots, V_{bm}$ are received at step S140 thereafter.

Subsequently, the congestion information generation unit 128 determines whether or not the specific time $t_{p3}$ (for example, 120 seconds) has elapsed since the congestion determination started (S132) based on the determination start time $t_{st}$ stored at step S106 and the current time included in the latest travel data received from the travel information acquisition unit 124 at step S108 or at S140. When the specific time $t_{p3}$ has not elapsed (NO at S132), after new travel data has been received from the travel information acquisition unit 124 (S140), processing returns to step S130 and is repeated.

When the specific time $t_{p3}$ has elapsed since the congestion determination started (YES at S132), the congestion information generation unit 128 determines whether or not the average vehicle speed $V_{ave2}$ is the specific determination speed $V_{th1}$ or less (S134). Then, if the average vehicle speed $V_{ave2}$ is the determination speed $V_{th1}$ or less (YES at S134), the congestion information generation unit 128 determines that congestion have possibly occurred on the intermittent-travel road. However, rather than processing transitioning to step S120 as-is and generating congestion location information, the congestion information generation unit 128 first determines whether or not a fixed filter condition is met by travel data up to where it was determined at step S134 that $V_{ave2} \leq V_{t1}$, to prevent various low speed travel states having causes other than congestion that are often encountered on intermittent-travel roads (namely, roads such as general roads on which interruptions to travelling are caused by signal devices or the like and crawling is caused by narrow segments or the like as described above) from being determined as congestion.

More specifically, at step S134, when the average vehicle speed $V_{ave2}$ is the determination speed $V_{th1}$ or less (YES at S134), the congestion information generation unit 128 determines whether or not a specific filter condition is met by the travel data received from the travel information acquisition unit 124 and stored in a duration extending from after the congestion determination started for intermittent travel (namely, after the flag was set to 1 at step S106) to the current time (S136). Then, when a filter condition has been met (YES at S136), determination is made that congestion is not occurring, and after new travel data has been received from the travel information acquisition unit 124 at step S140, processing returns to step S130 and is repeated.

When filter conditions have not been met (NO at S136), determination is made that congestion on the intermittent-travel road is occurring, processing transitions to step S120, and the congestion location information is generated and output.

At step S134, when the average vehicle speed $V_{ave2}$ exceeds the determination speed $V_{th1}$ (NO at S134), determination is made as to whether or not a specific time $t_{p4}$ (for example, 240 seconds) has elapsed since the congestion determination started based on the determination start time $t_{st}$ and the current time included in the latest travel data received from the travel information acquisition unit 124 at step S108 or S140 (S138). Then, when the specific time $t_{p4}$ has elapsed (YES at S138), determination is made that congestion is not occurring on the intermittent-travel road, and processing returns to step S102 and a standby state is adopted for the congestion determination starting condition to be met again.

When the specific time $t_{p4}$ since the congestion determination started at step S138 has not elapsed (NO at S138), after new travel data has been received from the travel information acquisition unit 124 at step S140, processing returns to step S130 and is repeated. Thus, if the vehicle speed decreases within the specific time $t_{p4}$ elapsing so as to meet the congestion occurrence condition for intermittent travel ($V_{ave2} \leq V_{th1}$), step S134 determines that congestion has possibly occurred on the intermittent-travel road.

Here, the filter conditions employed at step S136 may, for example, be conditions like the conditions below. Note that in the condition described below, the "current time" refers to the time held in the travel data that includes the last (latest) item of vehicle speed data employed in the calculation of the average vehicle speed for the determination at step S134 of whether congestion has possibly occurred. In the condition described later, "after the congestion determination started" refers to after the start of congestion determination (namely, after the flag has been set to 1 at step S106).

(1) Red Traffic Light Filter

A filter condition may be set such that low speed states caused by long waits at red traffic lights are not determined as congestion, for example, "there is a continuous stopped state (for example, the vehicle speed is continuously a specific vehicle speed (for example, 5 km/h or 1 km/h) or less) over a period extending from the current time backwards by a specific time (for example, 70 seconds)" (namely, when this condition is met, it is not determined that congestion has occurred; similar applies below). This condition may be expressed as "the state is a stopped state at the current time, and the continuous duration of the stopped state (continuously stopped time) is a specific time (for example, 70 seconds) or greater".

(2) Left/Right Turn Signal Filter

A filter condition may be set such that low speed states caused by waiting to turn left or right are not determined as congestion, for example, "a time at which the vehicle speed is a specific vehicle speed (for example, 5 km/h) or less is present in a period extending from after the congestion determination started to the current time, and a displacement distance (moving distance) from the position of the vehicle itself at that time to the position of the vehicle itself at the current time is a specific distance (for example, 20 m) or greater". Note that this condition can be expressed as "after the congestion determination started, travel resumes after entering a stopped state (for example, the vehicle speed is a specific vehicle speed (for example, 5 km/h) or less) and the displacement distance from after stopping to the current time is a specific distance (for example, 20 m) or greater".

(3) Low Speed Travel Filter 1

A filter condition may be set such that the travel state is not determined as a congestion state on roads where only low speed travel is possible such as mountain roads and ridgeways, for example, "in a period extending from after congestion determination started to the current time, the total time (crawling time) spent in a crawling state (for example, the vehicle speed is a specific vehicle speed (for example, 10 km/h) or less) is a specific time (for example, 30 seconds) or greater".

(4) Low Speed Travel Filter 2

Similarly to the low speed travel filter 1 described above, another filter condition may be set so that the travel state is not determined as a congestion state on roads where only low speed travel is possible such as mountain roads and ridgeways, for example, "the vehicle speed is continuously a specific vehicle speed (for example, 5 km/h or 10 km/h) or less in a period extending from the current time backwards by a specific time (for example, 10 seconds or 5 seconds) or greater".

In the congestion location determination processing illustrated in FIG. 2, in cases in which a specific state that disaffirms congestion occurrences (for example, a rise in vehicle speed that exceed a specific vehicle speed) has arisen after the congestion determination has started (namely, after the flag has been set to 1 at step S106), it is preferable to determine that congestion is not occurring and for processing to immediately return to step S102 and be repeated (to reset). For example, the conditions below may be provided as such reset conditions.

Reset Condition A

A reset condition that may be applied in both the congestion determination processing for continuous travel (steps S108 to S118) and the congestion determination processing for intermittent travel (steps S130 to S140).

(a1) Turn at Intersection Determination A1

Since low speed travel when turning at an intersection is not congestion, a condition may be set for determining such low speed travel and resetting, for example, "a case exists in which there was a time when the vehicle speed was a specific vehicle speed (for example, 30 km/h) or less in a duration extending from after the flag was set to 1 to the current time, and the displacement distance between the position of the vehicle itself at that time and the position of the vehicle itself at the current time is a specific distance (for example, 50 m) or less, and the difference between the travel direction of the vehicle itself at that time and the current travel direction of the vehicle itself is a specific value (for example, 70°) or greater" (namely, a reset is performed when this condition is met).

(a2) Turn at Intersection Determination A2

Similarly to the turn at intersection determination A1 described above, another condition may be set for determining low speed travel when turning at an intersection and resetting, this being a condition for resetting when a change in the travel direction has been determined at the intersection, for example, "a case exists in which, after the flag has been set to 1, the travel direction of the vehicle itself has continuously changed for a specific time (for example, 3 seconds) or greater, and the change in the travel direction over the specific time is a specific angle (for example, 70°) or greater" (namely, a reset is performed when this condition is met).

(a3) Travel Data Acquisition Interruption A3

For example, since appropriate congestion determination cannot be performed in a situation in which travel data cannot be acquired when the positioning device 106 cannot receive GPS signals due to travelling through a tunnel or the like, a condition may be set for detecting such a situation and resetting, for example, "a case exists in which, after the flag has been set to 1, data has continuously not been acquired from GPS signals by the positioning device 106 for a specific time (for example, 5 seconds) or greater" (namely, a reset is performed when this condition has been met).

Reset Condition B

This is a reset condition for enabling congestion determination processing for continuous travel (steps S108 to S118) to be applied (accordingly, the reset conditions A and B can be applied to steps S108 to S118).

(b1) Turn Determination B1

Since reduced speed travel on roads that bend at interchanges on expressways is not congestion, a condition may be set for detecting such situations and resetting, for example, "a case exists in which there was time when the vehicle speed was a specific vehicle speed (for example, 30 km/h) or less in a duration extending from after the flag was set to 1 to the current time, and the displacement distance between the position of the vehicle itself at that time and the position of the vehicle itself at the current time is a specific distance (for example, 90 m) or less, and the difference between the travel direction of the vehicle itself at that time and the current travel direction of the vehicle itself is a specific value (for example, 70°) or greater" (namely, a reset is performed when this condition is met).

(b2) Speed Recovery Determination B2

In order to immediately suspend the congestion determination in cases in which the vehicle speed has recovered to a normal speed (the speed when there is no congestion), a condition may be set for detecting such situations and resetting, for example, "a case exists in which the vehicle speed has increased to a specific vehicle speed (for example, 20 km/h) or greater after the flag has been set to 1" (namely, a reset is performed when this condition is met).

(b3) ETC Determination B4

For example, since reduced speed travel when passing through an exit tollgate of an expressway such as a tollgate in an electronic toll collection system (ETC system) is not congestion, a condition may be set for detecting such situations and resetting, for example, "in cases in which, after the vehicle speed has decreased to a specific minimum vehicle speed (for example, 30 km/h) or less, the vehicle speed became a specific vehicle speed (for example, 50 km/h) or greater in a specific time (for example, 120 seconds)" (namely, a reset is performed when this condition is met).

Reset Condition C

This is a reset condition to enable congestion determination processing (steps S130 to S140) for intermittent travel to be applied (accordingly, the reset conditions A and C can be applied to steps S130 to S140).

(c1) Speed Recovery Determination C1

Since the congestion determination is preferably immediately suspended in cases in which the vehicle speed has recovered to a normal speed (the speed when there is no congestion), a condition may be set for detecting such situations and resetting, for example, "a case in which the vehicle speed has become a specific vehicle speed (for example, 43 km/h) or greater after the flag has been set to 1" (namely, a reset is performed when this condition is met).

(c2) Parked on Road Determination C2

Since decelerating and stopping when the vehicle itself parks on the road is not congestion, a condition may be set for detecting such situations and resetting, for example, "a case exists in which a state in which the vehicle speed is a specific vehicle speed (for example, 5 km/h) or less has continued for a specific time (for example, 120 seconds) or greater after the flag was set to 1" (namely, a reset is performed when this condition is met).

Congestion Information Output Processing

Next, explanation follows regarding congestion information output processing.

The congestion information output processing is processing executed by the information output unit 122, and inspects the congestion location information received by the congestion information reception unit 132 from other vehicles via the wireless receiver 112 and stored as the congestion position data 144 in the storage device 104. If there is congestion location information that meets specific conditions, the congestion location information is output to the output control unit 120.

Figure 4:
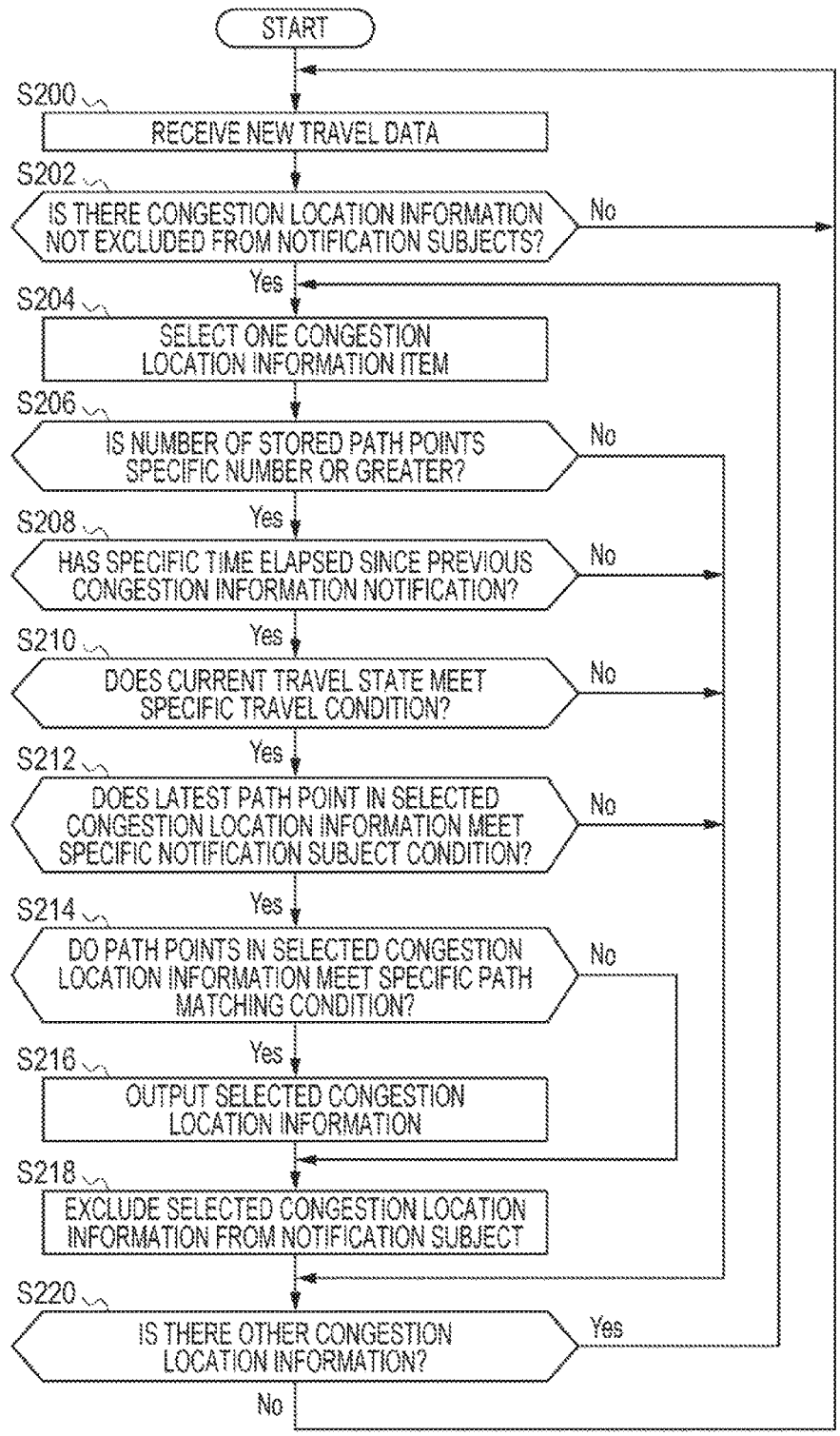
FIG. 4 is a flowchart illustrating a procedure of congestion information output processing executed by the congestion location information providing device illustrated in FIG. 1.

FIG. 4 is a flowchart illustrating a procedure of congestion information output processing. The processing starts when the power of the information providing device 100 is turned ON, and ends when the power thereof is turned OFF. Reception of congestion location information from other vehicles by the congestion information reception unit 132 and saving of the received congestion location information in the storage device 104 are independently performed in parallel with the congestion information output processing. Moreover, in parallel with the congestion information output processing, the travel information acquisition unit 124 sequentially and continuously adds the travel data (path points) at 5 m separations to the travel history data 142 in the storage device 104 as described above, and the specific number (for example, 20) of the recent items of travel data are held in the travel history data 142.

When the processing starts, after new travel data has first been received from the travel information acquisition unit 124 (S200), the information output unit 122 determines whether or not there is any congestion location information in the congestion position data 144 stored in the storage device 104 that is not excluded from notification subjects (S202). Congestion location information included in the congestion position data 144 in the storage device 104 is excluded at step S218 from the notification subjects in cases in which congestion notification information has been output based on the congestion location information at step S216, described later, and in cases in which a path matching condition has not been met at step S214, described later. Determination as to whether or not congestion location information has been excluded from the notification subjects may, for example, be made by appending a flag to each item of congestion location information included in the congestion position data 144 indicating whether or not the congestion location information is to be excluded from the notification subjects, storing the appended flag in the storage device 104, and referring to the stored flags. The flag may, for example, be stored when the congestion location information is stored in the storage device 104 in a state of being reset (to indicate a non-exclusion state) for the congestion location information, and may be set (to indicate an exclusion state) at step S218, described later.

Then, at step S202, when determined that there is no congestion location information that is not excluded (namely, when either all the congestion location information has been excluded, or no congestion location information is stored at all) (NO at S202), processing returns to step S200 and is repeated. Thus, the information output unit 122 places processing on standby until new congestion location information has been received from another vehicle via the wireless receiver 112 and the congestion information reception unit 132 and added to the congestion position data 144 in the storage device 104, and congestion location information not excluded from the notification subjects is present in the congestion position data 144.

At step S202, when there is congestion location information not excluded from the notification subjects (YES at S202), one item of congestion location information is selected as a processing subject from the non-excluded congestion location information (S204), and then determination is made as to whether or not a specific number (for example, 10) of path points (and thus items of travel data) are stored for the vehicle itself in the travel history data 142 stored in the storage device 104 (S206). Then, when the number of stored path points is less than the specific number (NO at S206), determination is made as to whether or not other congestion information that has not yet been selected (namely, other not yet selected "non-excluded congestion location information") is present in the congestion position data 144 in the storage device 104 (S220). When congestion information that has not yet been selected is present (YES at S220), processing returns to step S204, one item of congestion location information is selected from the congestion location information items that are not excluded from the notification subjects, and processing is repeated. When there is no other congestion location information present (NO at S220), processing returns to step S200 and is repeated. Thus, the travel information acquisition unit 124 periodically adds path points to the travel history data 142 in the storage device 104 in parallel with the congestion information output processing as described above, such that the determination of step S206 becomes YES and the processing of step S208 onwards is executed if the number of path points becomes the specific number or greater. Standing by until the specific number of path points are stored for the vehicle itself is performed in this manner so that appropriate determinations are made using a path matching condition at step S214, described later.

However, when the number of stored path points is the specific number or greater (YES at S206), determination is made as to whether or not a specific time (for example, 30 seconds) has elapsed since the previous congestion information notification (namely, the recent output of the congestion notification information at step S216 (described later)) (S208). The elapsed time since the previous congestion information notification may, for example, be measured by starting a timer (not illustrated in the drawings) included in the processing device 102 when the congestion notification information has been output at step S216, described later.

When the specific time has not elapsed since the previous congestion information notification (NO at S208), processing transitions to step S220 and the processing is then repeated until the specific time has elapsed. However, determination is made as to whether or not the current travel state meets a specific travel condition (S210) when the specific time has elapsed (YES at S208). This determination may, for example, be performed based on the latest travel data output from the travel information acquisition unit 124. Moreover, the travel condition may, for example, be set to "the current vehicle speed is a specific vehicle speed (for example, 40 km/h) or greater, and the current deceleration is less than a specific deceleration (for example, 0.15 G)". Such a travel condition is defined because in a low speed state of the specific speed or less, there is virtually no need to notify the driver of the presence of congestion in order to give the driver a margin in which to decelerate, and moreover, because notifying the presence of congestion will sometimes hinder driver behavior in cases in which a deceleration exceeds a particular deceleration.

Then, when the current travel state does not meet the specific travel condition (NO at S210), the information output unit 122 causes processing to transition to step S220, and the processing is repeated until the specific time has elapsed. Thus, the information output unit 122 stands by until the determination of steps S208 and S210 are affirmative (namely, until the specific time has elapsed since the previous congestion information notification and the travel state meets the specific travel condition).

However, when the current travel state meets a specific travel condition (YES at S210), determination is made as to whether or not the path point of the time that is the latest in time out of path points in the travel data included in the congestion location information selected at step S204 (namely, the path point in the travel data at the latest time included in the congestion location information) (also referred to as the "latest path point" hereafter) meets a specific notification subject condition, based on the current travel state of the vehicle itself output from the travel information acquisition unit 124 (S212).

Here, the notification subject condition may, for example, be the following condition.
(i) The position represented by the latest path point in the selected congestion location information is within a specific angle range (for example, ±90°) having a center on the current travel direction of the vehicle itself or is within a specific width range (for example, 30 m) having a center on the travel direction of the vehicle itself, and
(ii) the absolute value of the difference between the travel direction included in the travel data that includes the latest path point and the current travel direction of the vehicle itself is within a specific angle range (for example, 90°), and
(iii) the displacement distance between the position represented by the latest path point and the current position of the vehicle itself is a specific minimum distance or greater (for example, a distance that would be reached within a specific time (for example, 5 seconds) by the vehicle itself at the current vehicle speed, or greater) and is a specific maximum distance or less (for example, a distance obtained by adding the position error of the GPS data to a specific distance margin, or less), and
(iv) the difference between the altitude of the position represented by the latest path point and the current altitude of the vehicle itself is a specific value (100 m) or less.

When the latest path point included in the selected congestion location information meets the notification subject condition at step S212 (YES at S212), the information output unit 122 next determines whether or not the path points in the selected congestion location information meet the specific path matching condition (S214). Here, the specific path matching condition may, for example, be set to "amongst the path points in the selected congestion location information, there are a specific number (for example, 5) or greater of path points present in a specific distance error range that match, to within a specific distance error range (for example, within a position error range of the GPS data), the recent specific number (for example, 10) of path points for the vehicle itself".

Then, when the path matching condition has been met at step S214 (YES at S214), the information output unit 122 outputs the selected congestion location information to the output control unit 120 (S216). When the output control unit 120 has received the congestion location information, the output control unit 120 generates information (or a signal including the information) for notifying the driver of the presence of congestion based on the received congestion location information, and outputs the generated information or signal to the audio output device 162 and/or the display device 160 via the HMI communication INF 114.

Here, the "information for notifying the driver of the presence of congestion" may, for example, be audio information and/or displayed information. The audio information may, for example, be an alarm sound (or an instruction to emit a specific alarm sound) indicating the presence of congestion in the travel direction of the vehicle itself, and/or a warning message conveying information related to the congestion (for example, the distance to congestion and the like). Moreover, the display information may, for example, be set to image information for generating an image indicating the position of the congestion tail, and/or text of a display message conveying information related to the congestion (for example, the distance to the congestion and the like).

Instead of, or in addition to this, the output control unit 120 may transmit the congestion location information received from the information output unit 122 to another device, such as an onboard navigation device provided with an audio output device and/or a display device, via the wired communication INF 108. In such cases, the other device, such as an onboard navigation device, may provide to the driver the audio information and the image information stating that congestion is present ahead of the vehicle itself using the audio output device and/or the display device included in the other device.

Subsequently, after excluding the selected congestion location information from the notification subjects (S218), the information output unit 122 causes processing to transition to step S220 and the above processing is repeated. Note that, as described above, the exclusion from the notification subjects may be performed by setting a specific flag stored in the storage device 104 in association with the congestion location information.

When the latest path point does not meet the specific notification subject condition at step S212 (NO at S212), processing transitions to step S220. Moreover, when the specific path matching condition is not met at step S214 (NO at S214), processing transitions to step S218 without outputting the congestion notification information, and the selected congestion location information is excluded from the notification subjects.

Figure 5:
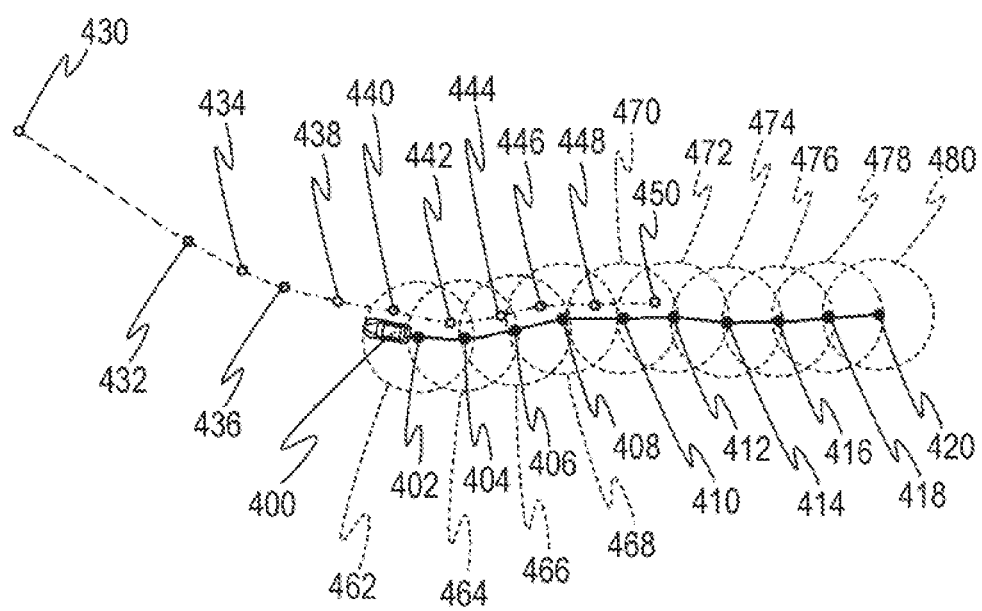
FIG. 5 is a schematic diagram illustrating an example of positional relationships between path points indicated by congestion location information and path points of a vehicle itself in a case in which a path matching condition is met in the congestion location information providing device illustrated in FIG. 1.

FIG. 5 is a diagram illustrating an example of a case in which the path points included in the congestion location information meet the path matching condition. The recent 10 path points 402 to 420 of a vehicle 400 are indicated by black circles in the drawing, and path points 430 to 450 included in congestion location information received from another vehicle are indicated by white circles in the drawings. Here, the path point 430 is the latest path point included in the congestion location information received from the other vehicle (the path point of the latest in time), and the path points 432 to 450 are the 10 path points in the congestion location information that have the oldest times. Moreover, the dashed circles 462 to 480 in the drawing centered on the path points 402 to 420 of the vehicle itself each indicate the respective specific distance error ranges from the path points 402 to 420. Note that although it is possible for several path points to be present between the latest path point 430 and the path point 432, these are omitted from illustration in FIG. 5 to simplify the representation and facilitate understanding.

In the example illustrated in FIG. 5, out of the path points included in the congestion location information received from the other vehicle, the six path points 440 to 450 are included in the specific distance error ranges 462 to 472 of the six path points 402 to 412 of the vehicle 400, and the information output unit 122 of the information providing device 100 onboard the vehicle 400 therefore determines that the path points in the congestion location information meet the path matching condition, and outputs the congestion location information (steps S214 and S216 of FIG. 4).

Thus, in the information providing device 100, determination is made whether or not the congestion location information is related to congestion ahead on the road on which the vehicle itself is travelling by determining a matching state between the path points in the received congestion location information and the path points of the vehicle itself, and the driver is notified based on the congestion location information if there is matching. Thus, in the information providing device 100, the driver will not be troubled with notifications of congestion information unrelated to the road on which the vehicle itself is travelling.

Determination of the path matching condition at step S214 of FIG. 4 is processing to more precisely determine congestion occurrences on the road on which the vehicle itself is travelling. Accordingly, in applications where it is permissible to relax the determination precision, determination as to whether or not the congestion location information is to be output may be established by the determination by notification subject condition of step S212 alone, without performing the path matching determination of step S214. In such cases, when the notification subject condition is not met at step S212, it is sufficient for processing to transition to step S218 and for the congestion location information that does not meet the notification subject condition to be excluded from the notification subjects.

As explained above, in the congestion location information providing device 100 according to the present embodiment, congestion occurrences are detected based on the current vehicle speed and deceleration, and the congestion location information, which includes a position history of the vehicle itself (path history) as information indicating the tail position of the congestion, is transmitted to other vehicles surrounding the vehicle itself. Moreover, the information providing device 100 receives congestion location information from other vehicles and determines whether or not a congestion location is present ahead of the vehicle itself based on the travel direction of the vehicle itself and/or the path history. When a congestion location is present, the information providing device 100 generates congestion notification information and outputs a signal for outputting the congestion notification information to the HMI device such as the audio output device or the display device.

The information providing device 100 can thereby detect congestion occurrences even when there is no map information or prior information regarding frequent congestion accident areas or the like, can share information indicating the position of the congestion tail between vehicles, and can notify or provide information regarding the occurrence of congestion (and/or the position thereof) to the driver of the vehicle itself.

The audio output device 162 such as a speaker and/or the display device 160 such as a liquid crystal display device, which are HMI devices connected to the congestion location information providing device 100 according to the present embodiment described above, may, for example, be an onboard speaker or display device included in a navigation device or the like, or may be a speaker or display device included in a portable electronic device such as a smartphone. In such cases, configuration may be made such that congestion notification information is output to a navigation device or smartphone provided with a display device and/or an audio output device via a wired communication INF 108 such as USB instead of the HMI communication interface, and the navigation device or smartphone that has received the information may output a warning or an alert message sound based on the received congestion notification information, and may display the congestion position on the display device.

Moreover, the congestion location information providing device 100 may, for example, be implemented by a portable electronic device such as a smartphone executing a specific application program.

In the embodiment described above, the audio output device 162 such as a speaker and the display device 160 such as a liquid crystal display device, which are HMI devices, are provided externally to the congestion location information providing device 100, 400. However, the display device 160 and/or the audio output device 162 may be configured as a portion of the information providing device 100.

Although the vehicle speed of the travel data is the instantaneous vehicle speed in the present embodiment, there is no limitation thereto. For example, average values of displacement over 5 seconds of instantaneous speeds acquired every one second may be employed as a vehicle speeds. Measurement errors in the instantaneous speed can be eliminated in such cases, enabling congestion determination to be made reliably. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A congestion location information providing device equipped in a first vehicle, the congestion location information providing device comprising:
    a travel information acquisition section that acquires travel information of the first vehicle including at least a position, a speed, and a deceleration of the first vehicle;
    an information generation section that generates congestion location information indicating a position of a congestion tail by using the travel information; and
    a transmission section that transmits the congestion location information generated by the information generation section to another vehicle such that the another vehicle notifies a driver of presence of congestion via an audible output device or a display device based on the congestion location information,
    wherein the information generation section:
    determines whether or not congestion is occurring at a current position of the first vehicle by using the deceleration and a speed reduction amount in a first time period of a specific length, the speed reduction amount being an amount of reduction in speed from a maximum speed and,
    when it is determined that the congestion is occurring, generates the congestion location information including position information containing the current position of the first vehicle as information indicating the congestion tail position.

2. The congestion location information providing device according to claim 1, wherein
    the information generation section:
    when the speed reduction amount is greater than a predetermined reduction amount and the deceleration is greater than a predetermined deceleration in the first time period, starts determination of whether or not the congestion is occurring and,
    when, after starting the determination, an average value of the speed has fallen to a predetermined speed or below in a second time period of a specific length after starting the determination, determines that congestion is occurring or determines that congestion is possibly occurring.

3. The congestion location information providing device according to claim 2, wherein
    the information generation section:
    when, after starting the determination of whether or not congestion is occurring, the speed has reduced to a specific speed or below, and then within a specific length of time since the reduction in speed, the speed has risen to a specific speed or greater, determines that the congestion is not occurring.

4. The congestion location information providing device according to claim 2, wherein
    the information generation section:
    after the determination that congestion is possibly occurring, determines whether or not at least one out of a continuously stopped time of the first vehicle, a straight line displacement distance of travel resumed after the continuous stopping, or a crawling time meets a specific condition in a period of time extending from the start of the determination of whether or not congestion is occurring to the determination that congestion is possibly occurring, and determines that congestion is not occurring when the specific condition is met.

5. The congestion location information providing device according to claim 1, further comprising:
    a reception section that receives congestion location information transmitted by the another vehicle;
    an information output section that determines whether or not a driver of the vehicle is to be notified of the congestion location information received from the another vehicle, by using the travel information; and
    an output controller that generates a signal including information to notify the driver of the presence of congestion, by using the received congestion location information to be notified to the driver determined by the information output section, and outputs the signal, wherein the information output section:
when a position of the congestion tail indicated by the received congestion location information is present within a specific distance range from the current position of the first vehicle and within a specific angle range having a center on travel direction of the first vehicle, determines that the driver is to be notified of the received congestion location information.

6. The congestion location information providing device according to claim 5, wherein
the received congestion location information includes a specific number of position information items for positions of the another vehicle that the another vehicle has recently passed through; and
the information output section, when the received congestion location information includes a specific number or greater of position information items indicating positions each matches, with a specific distance error range, any of a specific number of positions through which the first vehicle has recently passed, determines that the driver is to be notified of the received congestion location information.

7. A method for providing congestion location information, executed by a processing device of a congestion location information providing device equipped in a first vehicle, the method comprising:
a step of a travel information acquisition section of the processing device acquiring travel information of the first vehicle including at least a position, a speed, and a deceleration of the first vehicle;
a step of an information generation section of the processing device generating congestion location information indicating a position of a congestion tail by using the travel information; and
a step of a transmission section of the processing device transmitting the congestion location information generated by the information generation section to another vehicle such that the another vehicle notifies a driver of presence of congestion via an audible output device or a display device based on the congestion location information, wherein
in the step of generating, the information generation section determines whether or not congestion is occurring at a current position of the first vehicle by using the deceleration and an amount of reduction in speed from a maximum speed in a first time period of a specific length, and, when it is determined that the congestion is occurring, generates the congestion location information including position information containing the current position of the first vehicle as information indicating the congestion tail position.

8. The method according to claim 7, further comprising:
a step of a reception section of the processing device receiving congestion location information transmitted by the another vehicle;
a step of an information output section of the processing device determining whether or not a driver is to be notified of the congestion location information received from the another vehicle, by using the travel information; and
a step of an output controller of the processing device generating a signal including information to notify the driver of the presence of congestion, by using the received congestion location information to be notified to the driver determined by the information output section, and outputting the signal, wherein in the step of determining by the information output section, when a position of the congestion tail indicated by the received congestion location information is present within a specific distance range from the current position of the first vehicle and within a specific angle range having a center on the travel direction of the vehicle, the information output section determines that the driver is to be notified of the received congestion location information.

9. A non-transitory computer readable medium storing a program that causes a computer included in a congestion location information providing device equipped in a first vehicle to function as:
a travel information acquisition section that acquires travel information of the first vehicle including at least a position, a speed, and a deceleration of the first vehicle;
an information generation section that generates congestion location information indicating a position of a congestion tail by using the travel information; and
a unit for transmitting the congestion location information generated by the information generation section to another vehicle via a transmission section included in the congestion location information providing device such that the another vehicle notifies a driver of presence of congestion via an audible output device or a display device based on the congestion location information, wherein
the information generation section:
determines whether or not congestion is occurring at a current position of the first vehicle by using the deceleration and an amount of reduction in speed from a maximum speed in a first time period of a specific length and
when it is determined that the congestion is occurring, generates the congestion location information including position information containing the current position of the first vehicle as information indicating the congestion tail position.

10. The non-transitory computer readable medium storing the program according to claim 9, the program further causing the computer to function as:
a reception section that receives congestion location information transmitted by the another vehicle;
an information output section that determines whether or not a driver is to be notified of the congestion location information received from the another vehicle, by using the travel information; and
an output controller that generates a signal including information to notify the driver of the presence of congestion, by using the received congestion location information to be notified to the driver determined by the information output section, and outputs the signal,
wherein the information output section:
when a position of the congestion tail indicated by the received congestion location information is present within a specific distance range from the current position of the first vehicle and within a specific angle range having a center on the travel direction of the first vehicle, determines that the driver is to be notified of the received congestion location information.

11. The congestion location information providing device according to claim 1, wherein the congestion location information providing device is a portable electronic device.

12. The congestion location information providing device according to claim 5, wherein the information output section determines whether the speed of the first vehicle is lower than a threshold speed, and when the speed of the first vehicle is lower than the threshold speed, the information output section determines that driver of the vehicle is not to be notified of the congestion location information.

13. The congestion location information providing device according to claim 6, wherein when each of the positions is included in the specific distance error range of the any of the specific number of positions through which the first vehicle has recently passed, each of the positions matches the any of the specific number of positions.

* * * * *